Dec. 5, 1939.     H. E. EDGERTON     2,181,879
CUTTING MACHINE
Filed May 9, 1932
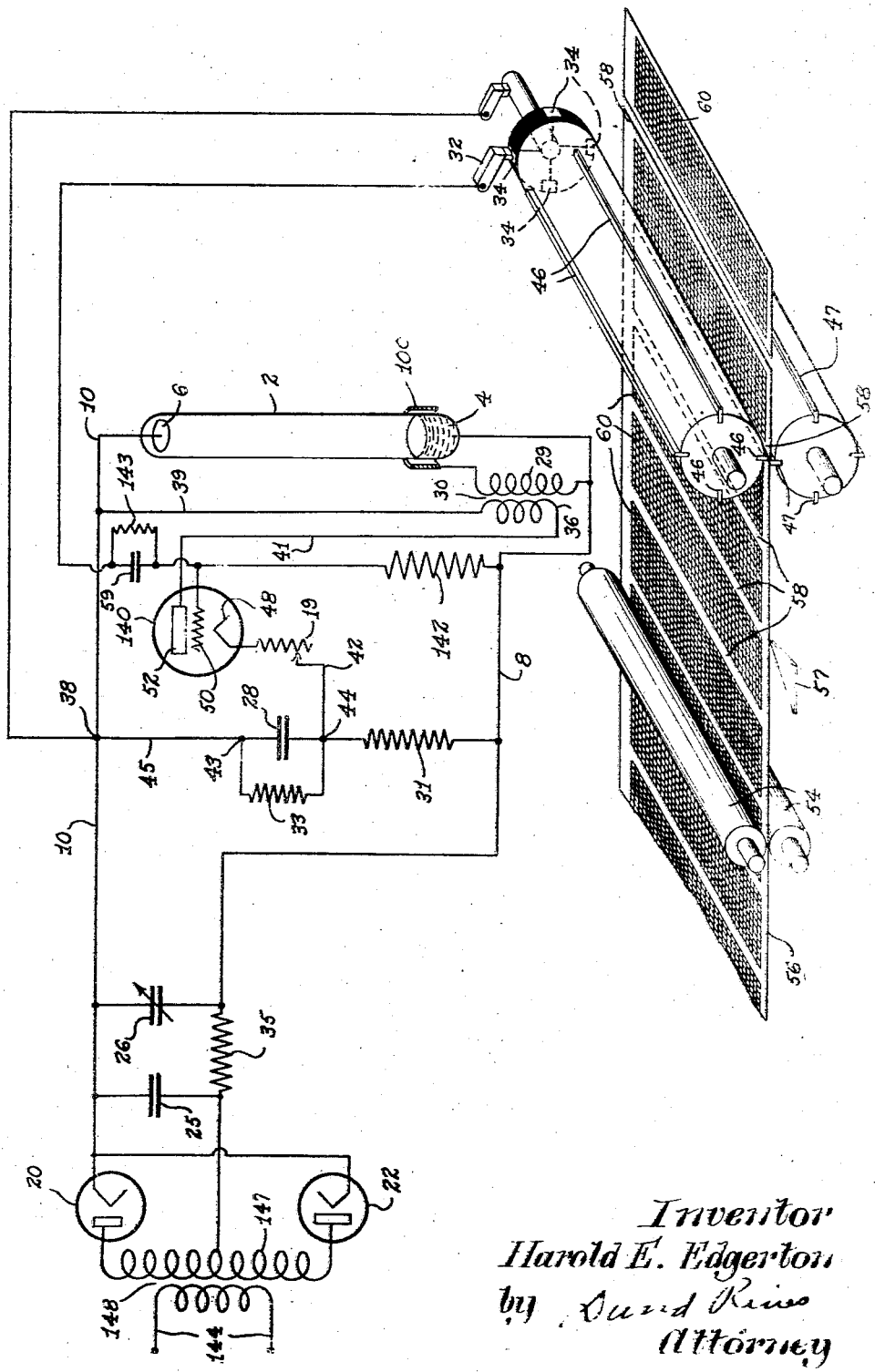
Inventor
Harold E. Edgerton
by
Attorney Patented Dec. 5, 1939

2,181,879

UNITED STATES PATENT OFFICE

2,181,879

CUTTING MACHINE

Harold Eugene Edgerton, Watertown, Mass.

Application May 9, 1932, Serial No. 610,045

19 Claims. (Cl. 164—68)

The present invention relates to cutting machines, and more particularly paper-cutting machines and the like.

An object of the invention is to provide a stroboscopic control for machines of the above-described character.

A further object of the invention is to aid in speeding up the operation of cutting machines.

Another object is stroboscopically to enable the operator to correct for errors in register.

Other and further objects will be explained hereinafter and will be particularly pointed out in the appended claims.

The invention will now be described in connection with the accompanying drawing, the single figure of which is a diagrammatic view of circuits and apparatus illustrating the invention in its preferred form.

A mercury-arc tube 2 is shown provided with a mercury-pool cathode 4 and an anode 6. The tube may be of the long, slender form illustrated, or it may have any other shape, such as zig-zag or helical. It may be provided with a restricted neck (not shown) at its lower end to permit tilting the tube to a horizontal position, though this is not essential. The cathode 4 and the anode 6 are shown respectively connected by conductors 8 and 10 to a main discharge condenser 26. The tube 2 and the main discharge condenser 26 are connected directly to each other, through a current-limiting impedance 35, which usually is a combination of resistance and inductance. The size of the capacity 26 is increased until there is sufficient light for the frequency of flashing. Slow speeds need a larger capacity than fast speeds. Energy to the condenser 26 comes from the source of direct current, after passing through the current-limiting impedance 35. The direct-current supply for the condenser 26 may be one or more batteries (not shown), direct-current generators, thermionic or gaseous-discharge rectifiers 20, 22, for producing a conventional, full-wave, rectifier circuit, or any other sources of direct current. The rectifiers 20, 22 may be connected with a source 144 of alternating current in any well known manner, as by means of the secondary winding 147 of a transformer 148. A capacitance 25 is part of the source of direct current and its function is to maintain a supply of energy between the pulses of power given by the rectifier units 20 and 22. The invention may, however, be used in connection with alternating-current sources (not shown).

The conductor 10 terminates upon the anode 6, one terminal of the condenser 26, and one end of the direct-current supply for the condenser 26. The conductor 8 terminates upon the cathode 4, the other terminal of the condenser 26 and one end of the series impedance 35. The opposite end of the impedance 35 is connected directly to the other end of the direct-current supply for the condenser 26. The series impedance may equally well be disposed in the positive side of the battery, in series with the conductor 10.

A small condenser 28, opposite terminals of which are shown at 43 and 44, is connected in series with an impedance 31 across any desirable source of direct current, which may be the direct current supply for the condenser 26.

A conductor 39 leads from the terminal 43 of the condenser 28 to one side of the primary 36 of a step-up transformer 30. From the other side of the primary 36, a conductor 41 completes the circuit through a thermionic tube 140, such as a Thyratron tube, and an adjustable impedance 19, to the other terminal 44 of the condenser 28. It is understood that the transformer 30 and the impedance 19 may be in either the anode or cathode circuit. The use of the Thryatron tube makes it possible to operate the circuit without any moving parts, except for causing the Thyratron 140 to function. The Thyratron 140 is shown provided with a cathode 48, a grid 50 and an anode 52. The terminal 43 of the condenser 28 is connected by a conductor 45 with a point 38 of the conductor 10, the circuit continuing by way of the conductor 39, the primary winding 36 and the conductor 41, to the anode 52. A conductor 42 connects the cathode 48, through the impedance 19, with the other terminal 44 of the condenser 28. The condenser 28, the Thyratron tube 140, and the primary winding 36 are thus all connected in series. The quantity of stroboscopic light is determined by the amount of energy in the condenser 26.

The secondary 29 of the step-up transformer 30 is connected to the cathode 4 and to an external condenser electrode or grid 100 on the outside of the mercury-vapor tube 2, around the mercury pool. The external condenser electrode 100 may be of any form, such as a wire-mesh screen, a wire wound around the tube 2, or a metal foil attached to the surface of the glass. For clearness, however, the electrode 100 is shown in the drawing as slightly separated from the tube 2. The position of the external condenser electrode 100 is so chosen that the operation of the tube 2 is the most satisfactory. Under usual conditions, the external condenser electrode 100 is the most effective when attached to the outside of tube 2, opposite the meniscus of the mercury. It likewise is possible to employ an internal electrode excited from the secondary 29 of the transformer 30 similarly to the excitation of the condenser electrode 100. This electrode may be placed either close to the cathode or far from it in the tube. The operation of such an internal starting electrode is not very satisfactory unless the tube is hot or unless there is a small amount of gas such as helium in the tube.

It will also be understood that the sudden, high voltage applied to the external electrode 100 for starting the tube 2 may be applied in other ways than by the use of the step-up transformer 30. The transformer 30 establishes a suddenly applied high potential gradient between the external electrode and the cathode. The action of this is to initiate the arc discharge through the tube.

The mercury-arc lamp is normally ineffective, since the vapor is not ionized, and the mercury-spot source of electrons is not formed, but the lamp 2 has the charged condenser 26 connected to its anode 6 and cathode 4, with no limiting resistance or reactance except for that of the conductors 10 and 8.

The energy in the condenser 28 is discharged through the primary 36 of the step-up transformer 30, thereby magnetically inducing a very high potential very quickly upon the external condenser electrode 100. The effect of this quickly applied, high voltage is such that the gas in the tube 2 is ionized and a source of electrons is caused to exist upon the mercury cathode 4. The main discharge condenser 26 discharges its energy violently into the tube 2 and part of this energy is transformed into useful light. The flash of light is very intense and lasts about one one-hundred-thousandth of a second. Sufficient quantity of light is obtainable in this manner to take a photograph in this very short time.

The impedance 19 is adjusted until sufficient voltage is obtained to make the operation satisfactory.

The arc through the tube 2 is not maintained, because of the action of the impedance 35, which limits the current flow to such an extent that the arc is extinguished. The condenser 26 is again charged before the next discharge. The inductance of the conductors 8 and 10 is useful in extinguishing the arc, as it tends to make the discharge current oscillatory. It is well known that the current of a mercury-arc tube does not reverse in the normal operation, since there is no source of electrons on the anode; and thus, if the current becomes zero, due to the oscillation, it will not be established in the opposite direction.

The instantaneous current through the mercury-arc light-pulse tube is very great, about one thousand amperes.

Although the operation of the tube 2 is satisfactory, when the vacuum is as close to perfect as it is possible to get it by present-day evacuation methods, the operation is likewise satisfactory when a small amount of gas, such as neon, helium, argon, air, etc., is put in the tube 2. These other gases cause modifications in the color of the light, because the characteristic spectral colors of the gas are radiated when the tube flashes. Other substances, such as sodium, aluminum, barium, iron, etc., or various combinations of these, might also be employed as the cathode at the bottom of the tube.

To aid in registering the cutter of a paper-cutting machine with the printing on the paper by means of a stroboscopic light source of the above described character arranged thereover, a stationary switch member or members 32 is adapted to cooperate with a movable switch member or members 34, shown operated by a rotating knife or knives 46. The knife or knives 46 are adapted to cut periodically a traveling paper web 56 along lines 58 between printed portions 60 as the paper is fed by feed rolls 54 from a printing machine (not shown) or a roll of web. The speed of the paper web 56 is manually controlled so that each knife 46, as it descends, shall always cooperate with a corresponding knife 47 so as to cut along the line 58. This, as practiced at the present day, is most tiring on the eyes. The speed of operation is necessarily very low. According to the present invention, however, the knife or knives 46 are caused to energize the circuit of the mercury tube 2 by means of the switch members 32 and 34. The paper will thus be stroboscopically illuminated by the tube 2 in synchronism with the knife or knives 46 cutting the web 56. The paper appears stationary to the eye when it is illuminated by the stroboscopic light actuated from the knives, since the printing moves exactly one page for each knife. A stationary reference marker 57 is purposely placed so that it points to a distinguishing feature of the printing at the exact time of the flash from the tube 2 so that the web will be properly cut when it comes under the knife. It is therefore necessary merely to adjust the speed of the web 56 manually, so that it always appears to be in the correct position with regard to the pointer 57. If the web appears to move towards the knives, the speed of the feed rolls 54 is decreased; and, likewise, if the web appears to drop back, the speed of the feed rolls is increased. The waste is materially reduced and the speed of operation may be enormously increased by the use of the invention.

I have shown the contacts 34 in line with the knives 46 and, with the contacts 34 so placed, the light flashes occur at each moment the material is cut. It is apparent that the operation will be equally satisfactory if the contacts 34 are displaced by a predetermined angle from the respective knives 46, in which case the light flashes will have a predetermined phase relation with the cutting stroke of knives 46.

The stroboscopic lamp 2 is arranged so that its light falls upon the printed web 60. In actual use, the lamp is usually put in a horizontal position, directly above the reference marker 57. The main discharge condenser 26 is directly connected to the mercury-arc lamp 2 through the conductors 8 and 10.

The contact members 32 and 34 cause a momentary surge through a small trip condenser 59, which raises the potential of the grid 50 of the Thyratron 140 to a high positive value with respect to the cathode 48 when the contacts close. After the surge, the condenser 59 is charged, and the grid 50 again becomes negative with respect to the cathode 49. At the instant the grid potential reaches a critical value, the anode 52 begins to complete the circuit 52, 48, 19, 42, 44, 28, 43, 45, 38, 10, 39, 36, 41, 52, containing the condenser 28 and the primary 36. The energy stored in the condenser 28 is violently discharged into the low-impedance primary 36 through the Thyratron 140. A relatively high voltage appears across the terminals of the secondary 29 of the step-up transformer 30 and the main arc in the tube 2 is thereby started.

The condenser 28 is again charged from the source of direct current. The charging current, which flows from the terminal 44, through the resistance 31, causes a voltage drop across the resistance 31, which is negative with respect to the cathode. This voltage drop is nearly equal to the voltage of the direct-current supply at the first instant, but becomes smaller as the condenser 28 is charged. The grid 50 is connected to the negative end of this resistance 31 through a resistance 142. Immediately after the condenser 28 discharges, the grid 50 is thus caused to be very negative with respect to the cathode 48 and, in this manner, the Thyratron 140 is prevented from starting when the anode becomes positive with respect to the cathode, as the condenser 28 builds up.

A resistance 33 is sometimes necessary to prevent the self operation of the Thyratron when the condenser becomes fully charged. It is possible purposely to connect the grid to various taps on the resistance 33 or 31 and thereby cause the Thyratron 140 to oscillate. It is also possible to replace the resistance 31 by a reactance and the Thyratron circuit will then generate its own oscillations at a frequency determined by the circuit constants and the characteristics of the tube.

Once the switches 32 and 34 become closed, they may remain closed without the Thyratron 140 flashing on again when the condensers 26 and 28 build up their voltages. The operation is independent of the length of time that the switches 32 and 34 remain closed, the complete function being performed at the moment when they first become closed. It will also be understood that the surge in the grid circuit of the Thyratron may be effected in other ways, as by the use of electrical transients in inductances, transformers or by impulses from photoelectric cells, etc. The potential upon the grid 50 of the Thyratron 140 controls the time of starting of the violent electrical transients that cause the stroboscopic light.

A resistance 143 is disposed across the condenser 59 in the grid circuit, and has such a value that the condenser 59 discharges when the switch members 32 and 34 are open between flashes in order to prepare for the next surge.

One characteristic of the present invention is that the light produced by the tube 2 may be of much higher instantaneous intensity than is attainable with mercury tubes the light of which is continuous, instead of periodic. If the tube were subjected continuously to the potential to which the condenser 26 is initially charged, it would become destroyed. It is found that the light thus periodically emitted by the high-current discharges of the tube at these high potentials, besides being of higher intensity, has a much larger proportion of components from the green, yellow and the red portions of the visible spectrum than is the case with the ordinary current discharges produced with mercury tubes as at present operated. This light, in fact, is such as to compare very favorably with natural, white light. The invention is thus adapted to all the stroboscopic uses of the present day, and also to many other uses where a light of good white quality is necessary. The ultra-violet portion of the spectrum also is found to have many additional components and those in the so-called near ultra-violet portion of the spectrum are very actinic and hence suitable for photographic work. In this respect this mercury-arc stroboscope is far superior to others, such as those using neon lamps.

It will be understood that the invention is not limited to use with the type of tube illustrated. It is possible, for example, to employ a tube containing sodium, neon or other substances such as have been mentioned heretofore. The described embodiment of the invention is, however, the best form that the invention has thus far assumed, from the points of view of efficiency of operation, simplicity in construction and inexpensiveness.

It should be understood that the accompanying drawing, while it illustrates a preferred embodiment of the invention, is not the only circuit arrangement in which it is possible to embody the invention. Modifications will occur to persons skilled in the art, and all such are considered to fall within the spirit and scope of the invention, as defined in the appended claims.

What is claimed is:

1. A cutting machine having, in combination, means for feeding material, means for cutting the material, means for actuating the cutting means to cause the cutting means to cut the material at predetermined points, stroboscopic means for illuminating the material comprising a tube having two metal electrodes and an external electrode, and means synchronized with the actuating means for establishing a high-potential gradient between the electrodes and the external electrode.

2. A cutting machine having, in combination, means for feeding material, means for cutting the material, means for actuating the cutting means to cause the cutting means to cut the material at predetermined points, stroboscopic means for illuminating the material comprising a mercury tube provided with an external electrode, and means synchronized with the actuating means for establishing a high-potential grad'ent between the mercury and one of the electrodes.

3. A cutting machine having, in combination, means for feeding material, means for cutting the material, means for actuating the cutting means to cause the cutting means to cut the material at predetermined points, stroboscopic means for illuminating the material comprising a tube, means for subjecting the medium in the tube to a relatively high potential, and means synchronized with the actuating means for rendering the subjecting means periodically effective and ineffective.

4. A cutting machine having, in combination, means for feeding material, means for cutting the material, means for actuating the cutting means to cause the cutting means to cut the material at predetermined points, stroboscopic means for illuminating the material comprising a tube, a condenser, and means synchronized with the actuating means for periodically charging the condenser and discharging it through the tube to cause pulses of light to be periodically emitted from the tube.

5. A cutting machine having, in combination, means for feeding material, means for cutting the material, means for actuating the cutting means to cause the cutting means to cut the material at predetermined points, stroboscopic means for illuminating the material comprising a mercury tube, means for connecting the tube in an electric circuit, and means synchronized with the actuating means for causing current to flow in the tube periodically.

6. A cutting machine having, in combination, means for feeding material, means for cutting the material, means for actuating the cutting means to cause the cutting means to cut the material at predetermined points, stroboscopic means for illuminating the material comprising a mercury tube, means for connecting the tube in an electric circuit, a member movable with the actuating means, and means controlled by a predetermined portion of the member for causing current to flow in the tube in synchronism with the movements of the member.

7. A cutting machine having, in combination, means for feeding material, means for cutting the material, means for actuating the cutting means to cause the cutting means to cut the material at predetermined points, stroboscopic means for illuminating the material comprising a mercury tube, means for connecting the tube in an electric circuit, a periodically movable member the periodic movements of which are controlled by the actuating means, and means for causing short intense pulses of current to flow in the tube in synchronism with the periodic movements of the member.

8. A cutting machine having, in combination, means for feeding material, means for cutting the material, means for actuating the cutting means to cause the cutting means to cut the material at predetermined points, stroboscopic means for illuminating the material comprising a mercury tube, means for connecting the tube in an electric circuit, and a Thyratron synchronized with the actuating means for periodically subjecting the mercury in the tube to a relatively high potential.

9. A cutting machine having, in combination, means for feeding material, means for cutting the material, means for actuating the cutting means to cause the cutting means to cut the material at predetermined points, stroboscopic means for illuminating the material comprising a mercury tube, means for connecting the tube in an electric circuit, a transformer for subjecting the mercury in the tube to a relatively high potential, and means synchronized with the actuating means for periodically opening and closing the circuit of the transformer.

10. A cutting machine having, in combination, means for feeding macterial, means for cutting the material, means for actuating the cutting means to cause the cutting means to cut the material at predetermined points, stroboscopic means for illuminating the material comprising a mercury tube, means for connecting the tube in an electric circuit, a transformer for subjecting the mercury in the tube to a relatively high potential, a periodically movable member the periodic movements of which are controlled by the actuating means, and means controlled by the member for opening and closing the circuit of the transformer substantially in synchronism with the periodic movements of the member.

11. A cutting machine having, in combination, means for feeding material, means for cutting the material, means for actuating the cutting means to cause the cutting means to cut the material at predetermined points, stroboscopic means for illuminating the material comprising a source of electric energy, a condenser connected with the source so as to be charged from the source, a transformer having a primary winding and a secondary winding, means for charging the primary winding from the condenser, a mercury tube, and means synchronized with the actuating means for subjecting the mercury of the tube to the potential of the secondary winding.

12. A cutting machine having, in combination, means for feeding material, means for cutting the material, means for actuating the cutting means to cause the cutting means to cut the material at predetermined points, stroboscopic means for illuminating the material comprising a source of electric energy, a condenser connected with the source so as to be charged from the source, a transformer having a primary winding and a secondary winding, a vacuum tube having an input circuit in which the condenser is connected and an output circuit in which the primary winding is connected, a mercury tube, and means synchronized with the actuating means for subjecting the mercury of the tube to the potential of the secondary winding.

13. A cutting machine comprising means for feeding material, means for cutting said material at predetermined points, said means including a luminescent discharge device for illuminating said material, means synchronized with said cutting means for causing a surge of current to flow through said discharge device, and means for adjusting the relative position of said material and said cutting means.

14. A cutting machine comprising means for continuously feeding material, means for cutting said material at predetermined points, said means including a luminescent discharge device for illuminating said material, a condenser, and means synchronized with said cutting means for periodically charging the condenser and discharging it through the discharge device to cause surges of current to flow through the discharge device.

15. A cutting machine comprising means for feeding material, means for cutting said material at predetermined points, said means including a luminescent discharge device for illuminating said material, means having a predetermined phase relation with said cutting means for causing a surge of current to flow through said discharge device, and means for adjusting the relative position of said material and said cutting means.

16. A cutting machine comprising means for continuously feeding material, means for cutting said material at predetermined points, said means including a luminescent discharge device for illuminating said material, a condenser, means for charging said condenser, and means having a predetermined phase relation with said cutting means for periodically causing said condenser to discharge through said discharge device.

17. A switching system of the character described comprising a lamp having an anode, a cathode and a grid; a current supply circuit interrupted by the said cathode and anode, a capacity across the anode and cathode, and a breaker circuit interrupted by the grid and cathode and including a source of current.

18. A switching system of the character described comprising a lamp having an anode, a cathode and a grid, a current-supply circuit interrupted by the cathode and the anode, a capacity across the cathode and the anode, an electric system having a circuit interrupted by the grid and the cathode, the electric system including means for biasing the grid, and means for controlling the flow of current in the electric system.

19. A switching system of the character described comprising a grid-controlled, gas-filled, thermionic tube having an anode, a cathode and a grid, a current-supply circuit interrupted by the cathode and the anode, a capacity across the cathode and the anode, a circuit interrupted by the grid and the cathode, the circuit including means for biasing the grid, and a switch for opening and closing the circuit.

HAROLD EUGENE EDGERTON.